United States Patent
Hwangbo

(10) Patent No.: US 9,191,651 B2
(45) Date of Patent: Nov. 17, 2015

(54) VIDEO DISPLAY APPARATUS AND OPERATING METHOD THEREFOR

(75) Inventor: Sang Kyu Hwangbo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 671 days.

(21) Appl. No.: 13/265,760

(22) PCT Filed: Apr. 23, 2010

(86) PCT No.: PCT/KR2010/002583
§ 371 (c)(1),
(2), (4) Date: Feb. 7, 2012

(87) PCT Pub. No.: WO2010/123324
PCT Pub. Date: Oct. 28, 2010

(65) Prior Publication Data
US 2012/0127282 A1    May 24, 2012

Related U.S. Application Data

(60) Provisional application No. 61/172,225, filed on Apr. 24, 2009.

(51) Int. Cl.
*H04N 13/04* (2006.01)
*H04N 13/02* (2006.01)

(52) U.S. Cl.
CPC ......... *H04N 13/026* (2013.01); *H04N 13/0454* (2013.01)

(58) Field of Classification Search
None
See application file for complete search history.

(56) References Cited

U.S. PATENT DOCUMENTS

| | | | | |
|---|---|---|---|---|
| 6,792,047 | B1 * | 9/2004 | Bixby et al. | 375/240.26 |
| 7,096,481 | B1 * | 8/2006 | Forecast et al. | 725/32 |
| 7,352,386 | B1 * | 4/2008 | Shum et al. | 348/42 |
| 7,720,768 | B1 * | 5/2010 | Risan | 705/59 |

(Continued)

FOREIGN PATENT DOCUMENTS

| | | |
|---|---|---|
| CN | 1882106 A | 12/2006 |
| WO | WO 03/053071 A1 | 6/2003 |
| WO | WO 2009/047681 A1 | 4/2009 |

OTHER PUBLICATIONS

Jung et al., "2D/3D Mixed Service in T-DMB System Using Depth Image Based Rendering," 10th Intl. Conf. on Advanced Communication Technology, Chapters 2 (Depth Image Based Rendering Technique), 3 (System Architecture), and 4 (XML-based Metadata), Feb. 17-20, 2008, pp. 1868-1871.

(Continued)

*Primary Examiner* — Heather Jones
*Assistant Examiner* — Mohammad J Rahman
(74) *Attorney, Agent, or Firm* — Birch, Stewart, Kolasch & Birch, LLP

(57) ABSTRACT

The present invention relates to a video display apparatus and an operating method therefor. The operating method for a video display apparatus according to one embodiment of the present invention comprises: receiving video information on an incoming video from outside or on a broadcast video; detecting conversion information between a 2D video and a 3D video within 3D video information, when the received video information is 3D video information; performing a 2D signal processing or a 3D signal processing on either the incoming video from outside or the broadcast video, according to the conversion information. In this way, it becomes easier to find out whether an incoming video from an external device is a 2D video or a 3D video.

7 Claims, 12 Drawing Sheets

(56) References Cited

U.S. PATENT DOCUMENTS

| | | | | |
|---|---|---|---|---|
| 9,052,519 | B2* | 6/2015 | Kong et al. | 1/1 |
| 2006/0153425 | A1* | 7/2006 | Kim et al. | 382/103 |
| 2006/0204007 | A1* | 9/2006 | Doetzkies et al. | 380/221 |
| 2008/0065393 | A1* | 3/2008 | Kincaid | 704/500 |
| 2008/0114605 | A1* | 5/2008 | Wu et al. | 704/500 |
| 2008/0309755 | A1* | 12/2008 | Yoshida et al. | 348/51 |
| 2009/0161762 | A1* | 6/2009 | Jun et al. | 375/240.16 |
| 2009/0235041 | A1* | 9/2009 | Harris | 711/170 |
| 2010/0111417 | A1* | 5/2010 | Ward et al. | 382/173 |
| 2011/0096069 | A1* | 4/2011 | Redmann | 345/419 |
| 2011/0103769 | A1* | 5/2011 | Risan | 386/252 |
| 2012/0162367 | A1 | 6/2012 | Ha | |

OTHER PUBLICATIONS

Lee et al., "A Structure for 2D/3D Mixed Service Based on Terrestrial DMB System," IEEE 3DTV Conference, Chapters 2 (3D Application in T-DMB) and 3 (2D/3D Mixed Service), 2007, 4 pages.

* cited by examiner (a)

(b)

(c)

(d)

(e)

| Byte/Bit # | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | NO_3DM_Packet | Valid_IN_Next | Affected_GR # | | | Current_GR # | | |
| HB2 | X | X | X | X | X | X | X | X |

VIDEO DISPLAY APPARATUS AND OPERATING METHOD THEREFOR

This application is the National Phase of PCT/KR2010/002583 filed on Apr. 23, 2010, which claims priority under 35 U.S.C. 119(e) of U.S. Provisional application No. 61/172,225 filed on Apr. 24, 2009, all of which are hereby expressly incorporated by reference into the present application.

TECHNICAL FIELD

The present invention relates to a video display apparatus and a method of operating the same and, more specifically, to a video display apparatus or a video display method, which are capable of easily checking whether a video received from an external device is a 2D video or a 3D video.

BACKGROUND ART

A video display apparatus is an apparatus equipped with a function of displaying a video which can be watched by a user. A user can watch broadcasting through a video display apparatus. The video display apparatus displays broadcasting selected by a user, from broadcast signals transmitted by a broadcasting station, in a display. There is a tendency that broadcasting is now being switched from analog broadcasting to digital broadcasting worldwide.

Digital broadcasting refers to broadcasting that transmits digital videos and audio signals. Digital broadcasting has less data loss because it is resistant to external noise, has advantageous error correction, and provides a vivid screen, as compared with analog broadcasting. Furthermore, digital broadcasting, unlike analog broadcasting, enables bi-directional service.

Furthermore, there are various researches recently being carried out on a stereoscopic image. Stereoscopic image technology gradually becomes general and commercialized not only in computer graphics, but also in other various environments and techniques.

DETAILED DESCRIPTION OF THE INVENTION

Technical Problem

An object of the present invention is to provide a video display apparatus and a method of operating the same, which are capable of easily checking whether an image or a broadcast video received from an external device is a 2D video or a 3D video.

Furthermore, another object of the present invention is to provide a video display apparatus and a method of operating the same, in which a user can easily check conversion between a 3D video and a 2D video at the time of the conversion.

Technical Solution

To achieve the objects, a method of operating a video display apparatus according to an embodiment of the present invention comprising the steps of receiving video information about a received external video or a received broadcast video, detecting conversion information between a 2D video and a 3D video within 3D video information, if the received video information is the 3D video information, and performing 2D signal processing or 3D signal processing on the received external video or the received broadcast video based on the conversion information.

Furthermore, to achieve the objects, a video display apparatus according to an embodiment of the present invention comprises an external device interface unit for transmitting and receiving data to or from an external device, a control unit for detecting conversion information between a 2D video and a 3D video from among pieces of video information about a received broadcast video or an external video received from the external device and for performing 2D signal processing or 3D signal processing on the received external video or the received broadcast video based on the conversion information, and a display for displaying a video subjected to the 2D signal processing or the 3D signal processing.

Advantageous Effects

According to an embodiment of the present invention, if video information about an external input image or a broadcast video is received and the received video information is 3D video information, whether the image or the broadcast video received from an external device is a 2D video or a 3D video can be easily checked by detecting conversion information between the 2D video and the 3D video within the 3D video information.

Furthermore, an object indicating conversion between a 3D video and a 2D video is displayed at the time of the conversion, so that a user can easily check the conversion.

BEST MODE FOR IMPLEMENTING THE INVENTION

The present invention is described in more detail with reference to the drawings.

The suffixes of constituent elements used in the following description, such as "module" and "unit," are assigned by simply taking only the easiness of writing this specification into consideration, but are not particularly given importance and roles. Accordingly, the "module" and "unit" may be mixed in use.

Figure 1:
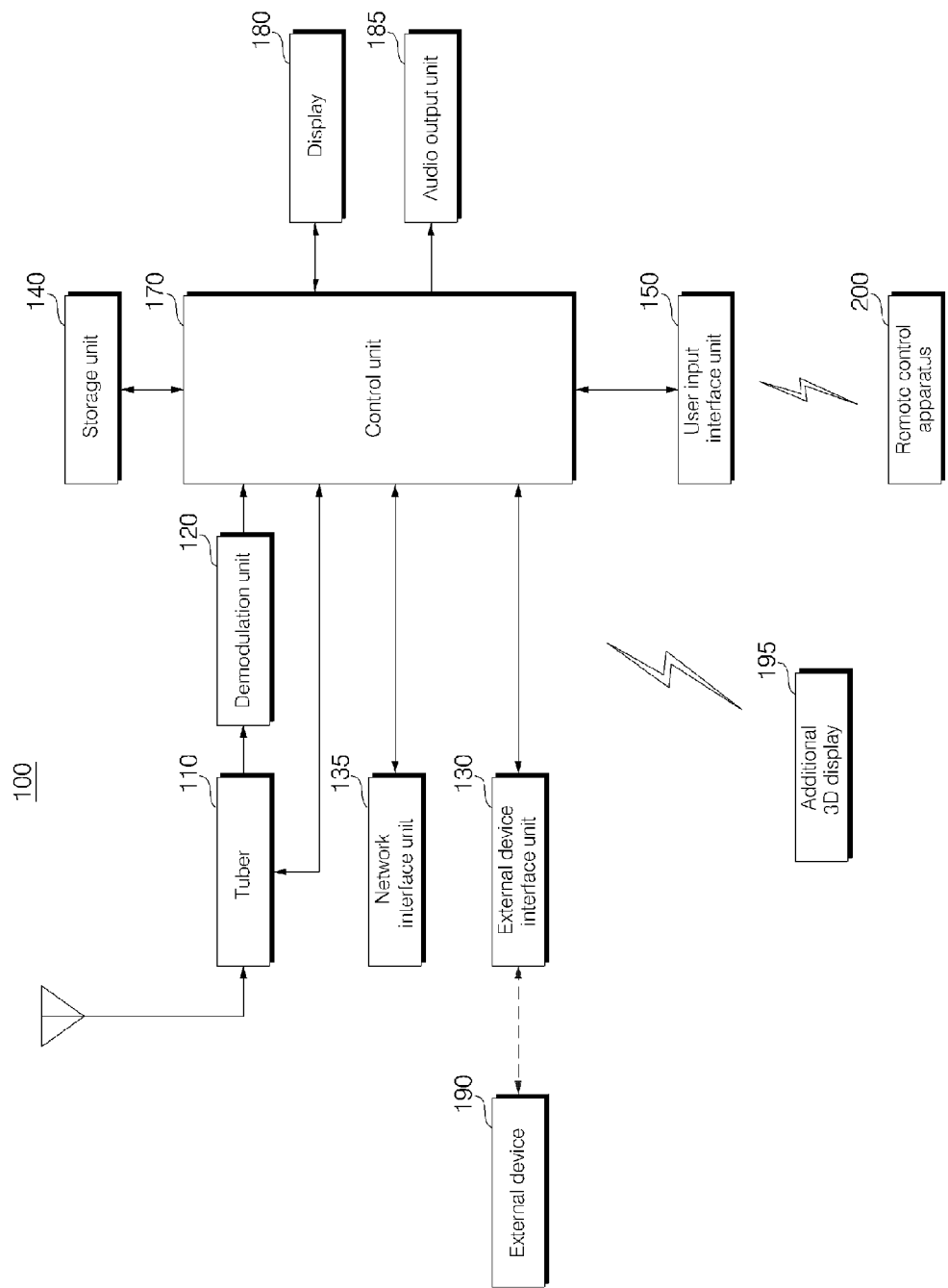
FIG. 1 is an internal block diagram of a video display apparatus according to an embodiment of the present invention.

FIG. 1 is an internal block diagram of a video display apparatus according to an embodiment of the present invention.

Referring to FIG. 1, the video display apparatus 100 according to the embodiment of the present invention may include a tuber 110, a demodulation unit 120, an external device interface unit 130, a network interface unit 135, a storage unit 140, a user input interface unit 150, a control unit 170, a display 180, an audio output unit 185, and an additional 3D display 195.

The tuber 110 selects Radio Frequency (RF) broadcast signals corresponding to a channel, selected by a user, or to all previously stored channels, from among RF broadcast signals received through an antenna. Furthermore, the tuber converts the selected RF broadcast signals into intermediate frequency signals or a baseband video, or audio signals.

For example, if the selected RF broadcast signal is a digital broadcast signal, the tuber converts the selected RF broadcast signal into a digital IF signal DIF. If the selected RF broadcast signal is an analog broadcast signal, the tuner converts the selected RF broadcast signal into an analog baseband video or an audio signal CVBS/SIF. That is, the tuber 110 may process a digital broadcast signal or an analog broadcast signal. The analog baseband video or the audio signal CVBS/SIF outputted from the tuber 110 may be directly inputted to the control unit 170.

Furthermore, the tuber 110 may receive an RF broadcast signal of a single carrier according to the Advanced Television System Committee (ATSC) method or an RF broadcast signal of plural carriers according to the Digital Video Broadcasting (DVB) method.

Meanwhile, in the present invention, the tuber 110 may sequentially select the RF broadcast signals of all the broadcast channels stored by a channel memory function, from among the RF broadcast signals received through the antenna, and may convert the selected RF broadcast signals into intermediate frequency signals or a baseband video, or audio signals.

The demodulation unit 120 receives the digital IF signal DIF converted by the tuber 110 and performs a demodulation operation.

For example, if the digital IF signal outputted from the tuber 110 is an ATSC method, the demodulation unit 120 performs 8-Vestigal Side Band (8-VSB) demodulation. Furthermore, the demodulation unit 120 may perform channel decoding. To this end, the demodulation unit 120 may include a Trellis decoder, an de-interleaver, a Reed Solomon decoder, etc. and perform Trellis decoding, de-interleaving, and Reed Solomon decoding.

For example, if the digital IF signal outputted from the tuber 110 is a DVB method, the demodulation unit 120 performs Coded Orthogonal Frequency Division Modulation (COFDMA) demodulation. Furthermore, the demodulation unit 120 may perform channel decoding. To this end, the demodulation unit 120 may include a convolution decoder, a de-interleaver, a Reed-Solomon decoder, etc. and perform convolution decoding, de-interleaving, and Reed Solomon decoding.

The demodulation unit 120 may output a stream signal TS after performing demodulation and channel decoding. Here, the stream signal may be a multiplexed signal of a video signal, an audio signal or a data signal. For example, the stream signal may be an MPEG-2 Transport Stream (TS) in which a video signal according to the MPEG-2 standard, an audio signal according to Dolby AC-3 standard, etc. are multiplexed. More particularly, the MPEG-2 TS may include a header of 4 bytes and a payload of 184 bytes.

Meanwhile, the demodulation unit 120 may be separately provided according to the ATSC method and the DVB method. That is, an ATSC demodulation unit and a DVB demodulation unit may be separately provided.

The stream signal outputted from the demodulation unit 120 may be inputted to the control unit 170. The control unit 170 performs demultiplexing, video/audio signal processing, etc., outputs a video to the display 180, and outputs audio to the audio output unit 185.

The external device interface unit 130 may transmit data to or receive data from an external device 190 connected thereto. To this end, the external device interface unit 130 may include an A/V input/output unit (not shown) or a wireless communication unit (not shown).

The external device interface unit 130 may be coupled to the external device 190, such as a Digital Versatile Disk (DVD), blue-ray, a game player, a camera, a camcorder, and a computer (notebook), in a wired/wireless manner. The external device interface unit 130 transfers a video, audio, or data signals, externally received through the external device 190 connected thereto, to the control unit 170 of the video display apparatus 100. Furthermore, the external device interface unit 130 may output a video, audio or data signals, processed by the control unit 170, to an external device connected thereto. To this end, the external device interface unit 130 may include an A/V input/output unit (not shown) or a wireless communication unit (not shown).

The A/V input/output unit may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc. so that the video and audio signals of the external device can be inputted to the video display apparatus 100.

The wireless communication unit may perform near field wireless communication with another electronic device. The video display apparatus 100 may be coupled to another electronic device over a network according to communication standards, such as bluetooth, Radio Frequency Identification (RFID), Infrared Data Association (IrDA) communication, Ultra Wideband (UWB), zigbee, and Digital Living Network Alliance (DLNA).

The external device interface unit 130 may also be coupled to various settop boxes through at least one of the above various terminals, and it may perform input/output operations with the settop boxes.

Meanwhile, the external device interface unit 130 may transmit data to and receive data from the additional 3D display 195.

The network interface unit 135 provides an interface for connecting the video display apparatus 100 to wired/wireless networks including an Internet network. The network interface unit 135 may include an Ethernet terminal for a connection with the wired network and may employ a Wireless LAN (WLAN, Wi-Fi), Wireless broadband (Wibro), World Interoperability for Microwave Access (Wimax), and a High Speed Downlink Packet Access (HSPDA) communication standard for a connection with the wireless network.

The network interface unit 135 may receive content or data, provided by the Internet, a content provider, or a network operator, over a network. That is, the network interface unit 135 may receive content, such as movies, advertising, games, VOD, and broadcast signals provided by the Internet and the content provider over a network, and relevant information. Furthermore, the network interface unit 135 may receive update information and update files for firmware which are provided by the network operator. Furthermore, the network interface unit 135 may transmit data to the Internet, the content provider, or the network operator.

The network interface unit 135 may also be coupled to, for example, Internet Protocol (IP) TV and configured to receive videos, audio, or data signals processed by a settop box for IPTV and transfer them to the control unit 170 so that bi-directional communication is possible. The network interface unit 135 may transfer signals, processed by the control unit 170, to the settop box for IPTV.

Meanwhile, the above IPTV may mean ADSL-TV, VDSL-TV, FTTH-TV, etc. according to a type of a transfer network or may mean TV over DSL, Video over DSL, TV overIP (TVIP), Broadband TV (BTV), etc. Furthermore, the IPTV may mean Internet TV that can access the Internet or full-browsing TV.

The storage unit 140 may store a program for processing and controlling signals within the control unit 170 and may store videos subjected to signal processing, audio, or data signals.

The storage unit 140 may also perform a function of temporarily storing videos, audio, or data signals which are inputted to the external device interface unit 130. Furthermore, the storage unit 140 may store information about a specific broadcast channel through the channel memory function, such as a channel map.

The storage unit 140 may include at least one type of storage media, such as a flash memory type, a hard disk type, a multimedia card micro type, card type memory (for example, SD or XD memory), RAM, and ROM (EEPROM, etc.). The video display apparatus 100 may play a file (a moving image file, a static image file, a music file, a document file, etc.) stored in the storage unit 140 and provide it to a user.

An embodiment in which the storage unit 140 is provided separately from the control unit 170 is shown in FIG. 1, but the scope of the present invention is not limited thereto. The storage unit 140 may be included in the control unit 170.

The user input interface unit 150 transfers a signal, inputted by a user, to the control unit 170 or transfers a signal from the control unit 170 to a user.

For example, the user input interface unit 150 may receive user input signals, such as power on/off, channel selection, and screen setting, from a remote control apparatus 200 and transmit signals from the control unit 170 to the remote control apparatus 200 according to various communication methods, such as a Radio Frequency (RF) communication method and an IR communication method.

For example, the user input interface unit 150 may also transfer user input signals, inputted through local keys (not shown), such as a power key, a channel key, a volume key, and a setting key, to the control unit 170.

For example, the user input interface unit 150 may also transfer user input signals, received from a sensing unit (not shown) for sensing a user's gesture, to the control unit 170 or may transmit signals from the control unit 170 to the sensing unit (not shown). Here, the sensing unit (not shown) may include a touch sensor, an audio sensor, a position sensor, an operation sensor, etc.

The control unit 170 may generate and output signals for video or audio output by demultiplexing received streams or processing demultiplexed signals through the tuber 110, the demodulation unit 120, or the external device interface unit 130.

A video signal subjected to video processing in the control unit 170 may be inputted to the display 180 and displayed as a video corresponding to the video signal. Furthermore, the video signal subjected to video processing in the control unit 170 may be inputted to an external output device via the external device interface unit 130.

An audio signal processed by the control unit 170 may be outputted to the audio output unit 185 in the form of sound. Furthermore, the audio signal processed by the control unit 170 may be inputted to an external output device via the external device interface unit 130.

Although not shown in FIG. 1, the control unit 170 may include a demultiplexing unit, a video processing unit, etc., which is described later with reference to FIG. 2.

In addition, the control unit 170 may control the overall operation of the video display apparatus 100. For example, the control unit 170 may control the tuber 110 so that RF broadcasting, corresponding to a channel selected by a user or to a previously stored channel, can be tuned.

The control unit 170 may also control the video display apparatus 100 in response to a user command, received through the user input interface unit 150, or according to an internal program.

For example, the control unit 170 controls the tuber 110 so that the signal of a channel selected in response to a specific channel selection command received through the user input interface unit 150 is inputted. The control unit 170 also processes a video, audio, or data signals corresponding to the selected channel. The control unit 170 enables channel information, selected by a user, to be outputted through the display 180 or the audio output unit 185 along with a processed video or audio signals.

For another example, the control unit 170 enables a video signal or an audio signal, received from the external device 190 (for example, a camera or a camcorder) through the external device interface unit 130, to be outputted through the display 180 or the audio output unit 185, in response to an external device video play command received through the user input interface unit 150.

Meanwhile, the control unit 170 may control the display 180 so that an image is displayed. For example, the control unit 170 may perform control so that broadcast video received through the tuber 110, an external input video received through the external device interface unit 130, a video received through the network interface unit 135, or a video stored in the storage unit 140 is displayed in the display 180.

Here, the video displayed in the display 180 may be a static image or a moving image and may be a 2D video or a 3D video.

Meanwhile, the control unit 170 generates a specific object, from among videos displayed in the display 180, in the form of a 3D object and displays the specific object. For example, the object may be at least one of a connected web screen (newspaper, a magazine, etc.), an Electronic Program Guide (EPG), various menus, widgets, icons, static images, moving images, and text.

The 3D object may be processed to have a different depth from an image displayed in the display 180. Preferably, the 3D object may be processed so that the 3D object looks like being projected as compared with the image displayed in the display 180.

Meanwhile, the control unit 170 recognizes the position of a user on the bias of an image captured by a photographing unit (not shown). For example, the control unit 170 may check the distance (z-axis coordinates) between a user and the video display apparatus 100. In addition, the control unit 170 may check x-axis coordinates and y-axis coordinates within the video display apparatus 100, corresponding to a user position.

Meanwhile, although not shown, a channel browsing processing unit for generating a thumbnail video, corresponding to channel signals or external input signals, may be further included. The channel browsing processing unit may receive stream signals TS outputted from the demodulation unit 120, stream signals outputted from the external device interface unit 130, etc., extract images form the received stream signals, and generate a thumbnail video based on the extracted images. The generated thumbnail video may be inputted to the control unit 170 without change or may be coded and inputted to the control unit 170. Furthermore, the generated thumbnail video may be coded in a stream form and then inputted to the control unit 170. The control unit 170 may display a thumbnail list, including a plurality of the thumbnail videos, in the display 180 by using the received thumbnail videos. Here, the thumbnail list may be displayed according to an easy view method of displaying the thumbnail list in some regions in the state where a specific video has been displayed in the display 180 or may be displayed according to the whole view method of displaying the thumbnail list in most of the regions of the display 180.

The display 180 generates a driving signal by converting a video signal, a data signal, an OSD signal, and a control signal processed by the control unit 170 or a video signal, a data signal, and a control signal received from the external device interface unit 130.

The display 180 may be a PDP, an LCD, an OLED, a flexible display, or the like. In particular, according to an embodiment of the present invention, it is preferred that the display 180 be a three-dimensional (3D) display.

In order to watch a 3D video, the display 180 may be divided into an additional display method and an independent display method.

In the independent display method, the display 180 may independently implement a 3D video without an additional display (for example, glasses). Various methods, such as a lenticular method and parallax barriers, may be applied to the independent display method.

Meanwhile, in the additional display method, a 3D video is implemented by using an additional display other than the display 180. Various method, such as a head mount, a display (HMD) type, and a glasses type, may be applied to the additional display method. Furthermore, the glasses type may be divided into a passive method, such as a polarization glasses type, and an active method, such as a shutter glasses type. Meanwhile, the head mount display type may also be divided into a passive method and an active method.

In an embodiment of the present invention, it is assumed that the additional 3D display 195 is provided in order to watch a 3D video. The additional 3D display 195 enables the additional display of the passive method or the additional display of the active method. It is hereinafter assumed that the additional 3D display 195 is the shutter glasses of the active method.

Meanwhile, the display 180 may be formed of a touch screen and used as an input device in addition to an output device.

The audio output unit 185 receives a signal (for example, a stereo signal, a 3.1 channel signal, or 5.1 a channel signal) subjected to audio processing in the control unit 170 and outputs the signal in the form of audio. The audio output unit 185 may be implemented using a speaker of various forms.

Meanwhile, the sensing unit (not shown), including at least one of a touch sensor, an audio sensor, a position sensor, and an operation sensor as described above in order to detect a user's gesture, may be further included in the video display apparatus 100. A signal detected by the sensing unit (not shown) is transmitted to the control unit 170 via the user input interface unit 150.

The control unit 170 may detect a user's gesture by detecting a video photographed by the photographing unit (not shown) or a signal detected by the sensing unit (not shown) or by combining the video and the signal.

The remote control apparatus 200 transmits a user input to the user input interface unit 150. To this end, the remote control apparatus 200 may employ a method, such as bluetooth, RF communication, IR communication, UWB, and zigbee. Furthermore, the remote control apparatus 200 may receive videos, audio, or data signals outputted from the user input interface unit 150 and display them or output them in the form of audio.

The video display apparatus 100 may be a digital broadcast receiver as a fixed type, which is capable of receiving at least one of digital broadcasting of the ATSC method (7-VSB method), digital broadcasting of the DVB-T method (COFDM method), and digital broadcasting of the ISDB-T method (BST-OFDM method). Furthermore, the video display apparatus 100 may be a digital broadcast receiver as a movable type, which is capable of receiving at least one of digital broadcasting of the terrestrial DMB method, digital broadcasting of the satellite DMB method, digital broadcasting of the ATSC-M/H method, digital broadcasting of the DVB-H method (COFDM method), and digital broadcasting of the media forward link only method. Furthermore, the video display apparatus 100 may be a digital broadcast receiver for a cable, satellite communication, or IPTV.

Meanwhile, the video display apparatus described in this specification may include a TV receiver, a handheld phone, a smart phone, a notebook computer, a terminal for digital broadcasting, a Personal Digital Assistants (PDA), a Portable Multimedia Player (PMP), etc.

Meanwhile, the block diagram of the video display apparatus 100 shown in FIG. 1 is a block diagram for an embodiment of the present invention. The constituent elements of the block diagram may be integrated, added, or omitted according to a specification of the video display apparatus 100 that is actually implemented. That is, 2 or more constituent elements of the video display apparatus 100 may be integrated into one element, or one constituent element of the video display apparatus 100 may be divided into 2 or more elements, if necessary. Furthermore, functions performed in each block are for illustrating an embodiment of the present invention, and a detailed operation or apparatus does not limit the scope of the present invention.

Figure 2:
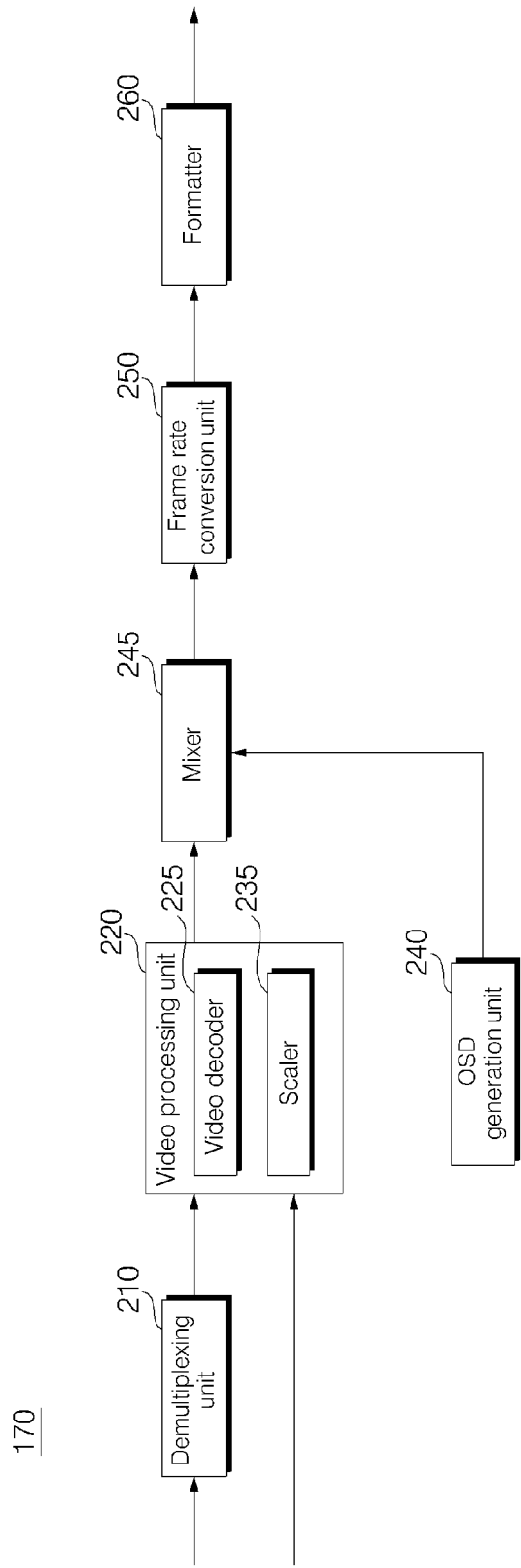
FIG. 2 is an internal block diagram of a control unit of FIG. 1.
Figure 3:
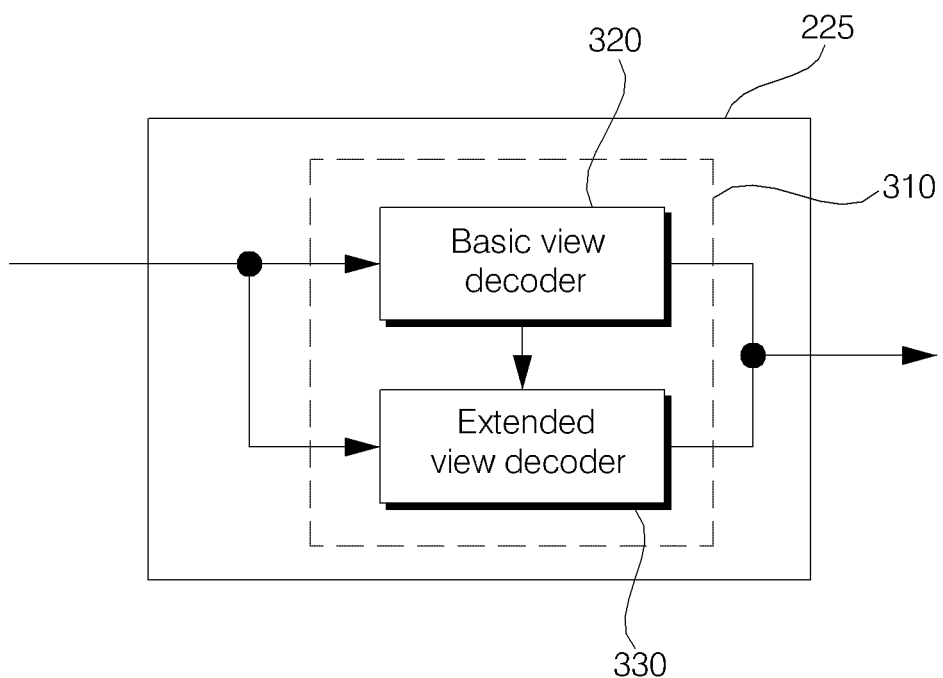
FIG. 3 is an internal block diagram of a video decoder of FIG. 2.
Figure 4:
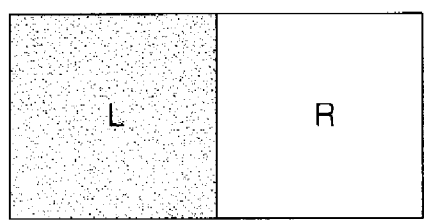
FIG. 4 is a diagram showing various formats of a 3D video.
Figure 4:
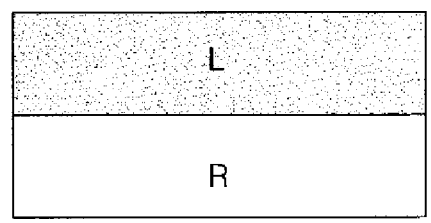
Figure 4:
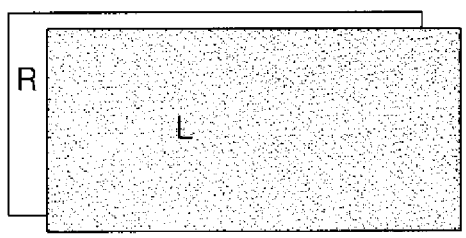
Figure 4:
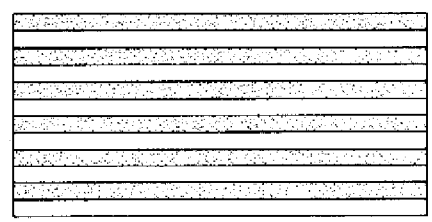
Figure 4:
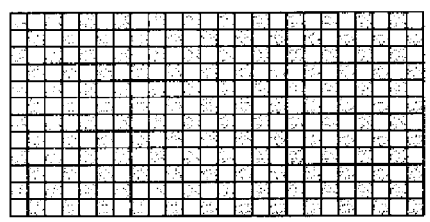
Figure 5:
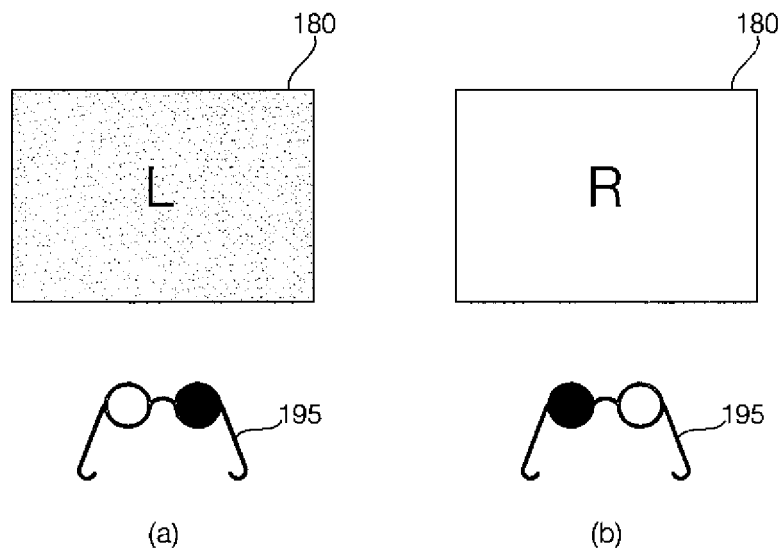
FIG. 5 is a diagram showing the operation of a shutter glasses according to a frame sequential format of FIG. 4.

FIG. 2 is an internal block diagram of the control unit of FIG. 1, FIG. 3 is an internal block diagram of a video decoder of FIG. 2, FIG. 4 is a diagram showing various formats of a 3D video, and FIG. 5 is a diagram showing the operation of a shutter glasses according to a frame sequential format of FIG. 4.

Referring to the drawings, the control unit 170 according to an embodiment of the present invention may include a demultiplexing unit 210, a video processing unit 220, an OSD generation unit 240, a mixer 245, a frame rate conversion unit 250, and a formatter 260. The control unit 170 may further include an audio processing unit (not shown) and a data processing unit (not shown).

The demultiplexing unit 210 demultiplexes received streams. For example, when MPEG-2 TSs are received, the demultiplexing unit 210 may separate the MPEG-2 TSs into a video, audio, and data signals by demultiplexing the MPEG-2 TSs. A stream signal inputted to the demultiplexing unit 210 may be a stream signal outputted from the tuber 110, the demodulation unit 120, or the external device interface unit 130.

The video processing unit 220 may perform video processing on the demultiplexed video signal. To this end, the video processing unit 220 may include a video decoder 225 and a scaler 235.

The video decoder 225 decodes the demultiplexed video signal, and the scaler 235 performs scaling so that the resolution of the decoded video signal can be outputted through the display 180.

The video decoder 225 may include a decoder of various standards.

FIG. 3 illustrates a 3D video decoder 310 for decoding a 3D video signal within the video decoder 220.

A demultiplexed video signal inputted to the 3D video decoder 310 may be, for example, a video signal coded according to the Multi-view Video Coding (MVC) standard, a video signal coded according to the dual AVC standard, or a signal in which a coded left-eye image signal and a coded right-eye image signal are mixed.

If the received signal is a signal in which a coded left-eye image signal and a coded right-eye image signal are mixed as described above, a 2D video decoder may be used without change. For example, if the demultiplexed video signal is a video signal coded according to the MPEG-2 standard or a video signal coded according to the AVC standard, the video signal may be decoded by an MPEG-2 decoder or an AVC decoder.

Meanwhile, the 3D video decoder 310 includes a basic view decoder 320 and an extended view decoder 330.

For example, if an extended view video, from a coded 3D video signal inputted to the 3D video decoder 310, has been coded according to the MVC standard, a relevant basic view video must be decoded in order to decode the extended view video. To this end, a basic view video decoded by the basic view decoder 320 is transferred to the extended view decoder 330.

Accordingly, the decoded 3D video signal outputted from the 3D video decoder 310 has specific delay until the decoding of the extended view decoder 330 is completed. Consequently, the decoded basic view video and the decoded extended view video are mixed and outputted.

For example, if an extended view video, from a coded 3D video signal inputted to the 3D video decoder 310, has been coded according to AVC, the extended view video and the basic view video can be decoded in parallel, unlike in the above MVC case.

Accordingly, the basic view decoder 320 and the extended view decoder 330 perform decoding operations independently. Meanwhile, the decoded basic view video and the decoded extended view video are mixed and outputted.

Meanwhile, the video signal decoded by the video processing unit 220 may include only a 2D video signal, a mixture of a 2D video signal and a 3D video signal, and only a 3D video signal.

For example, an external video signal received from the external device 190 or a broadcast video signal of a broadcast signal received from the tuber 110 may include only a 2D video signal, a mixture of a 2D video signal and a 3D video signal, and only a 3D video signal. Accordingly, the video signal is subsequently processed by the control unit 170, in particular, the video processing unit 220, so that a 2D video signal, a mixed signal of a 2D video signal and a 3D video signal, and a 3D video signal can be outputted.

In an embodiment of the invention, in particular, whether an external video signal received from the external device 190 or a broadcast video signal received from the tuber 110 is a 2D video signal or a 3D video signal can be easily checked. This is described later with reference to FIG. 8 and subsequent drawings.

Meanwhile, the video signal decided by the video processing unit 220 may be a 3D video signal of various formats. For example, the video signal decided by the video processing unit 220 may be a 3D video signal consisting of a color image and a depth image, a 3D video signal consisting of a video signal having a plurality of view points. The video signal having a plurality of view points may include, for example, a left-eye image signal and a right-eye image signal.

Here, the formats of the 3D video signal, as shown in FIG. 4, may include a side-by-side format (FIG. 4a) in which a left-eye image signal L and a right-eye image signal R are disposed left and right, a frame sequential format (FIG. 4b) in which a left-eye image signal L and a right-eye image signal R are disposed in a time-dividing way, a top/down format (FIG. 4c) in which a left-eye image signal L and a right-eye image signal R are disposed at the top and bottom, an interlaced format (FIG. 4d) in which a left-eye image signal L and a right-eye image signal R are mixed for every line, a checker box format (FIG. 4e) in which a left-eye image signal L and a right-eye image signal R are mixed for every box, and so on.

The OSD generation unit 240 generates an OSD signal directly or in response to a user input. For example, the OSD generation unit 240 may generate a signal for displaying various pieces of information on a screen of the display 180 in the form of graphics or text on the basis of a user input signal. The generated OSD signal may include various data, such as the user interface screen, various menu screens, widgets, and icons of the video display apparatus 100. The generated OSD signal may further include a 2D object or a 3D object.

The mixer 245 may mix the OSD signal generated by the OSD generation unit 240 and a decoded video signal subjected to video processing in the video processing unit 220. Here, each of the OSD signal and the decoded video signal may include at least one of a 2D signal and a 3D signal. The mixed video signal is provided to the frame rate conversion unit 250.

The frame rate conversion unit (FRC) 250 converts the frame rate of an received video. For example, the frame rate conversion unit 250 converts a frame rate of 60 Hz into a frame rate of 120 Hz or 240 Hz. If the frame rate of 60 Hz is converted into the frame rate of 120 Hz, the first identical frame may be inserted between the first frame and a second frame, or a third frame predicted from the first frame and the second frame may be inserted between the first frame and the second frame. If the frame rate of 60 Hz is converted into the frame rate of 240 Hz, three identical frames may be further inserted, or three predicted frames may be inserted.

Meanwhile, the frame rate conversion unit 250 may output a received frame rate without additionally converting the frame rate. If a 2D video signal is received, the frame rate may be preferably outputted without change. Meanwhile, if a 3D video signal is received, the frame rate may be varied as described above.

The formatter 260 may receive the signal mixed by the mixer 245 (that is, the OSD signal and the decoded video signal) and separate a 2D video signal and a 3D video signal from the mixed signal.

Meanwhile, in this specification, the 3D video signal is meant to include a 3D object. Examples of the object may include a Picture In Picture (PIP) video (a static image or a moving image), an EPG indicating broadcast program information, various menus, widgets, icons, text, things, persons, backgrounds, and web screens (newspaper, magazines, etc.) within a video, and so on.

Meanwhile, the formatter 260 may change a format of a 3D video signal. For example, the formatter 260 may change a format of a 3D video signal into any one of the various formats illustrated in FIG. 4. In particular, in an embodiment of the present invention, it is assumed that a format of a 3D video signal is changed into the frame sequential format, from among the formats shown in FIG. 4. That is, a left-eye image signal L and a right-eye image signal R are sequentially arranged alternately. Accordingly, it is preferred that the additional 3D display 195 of FIG. 1 be a shutter glasses.

FIG. 5 illustrates an operation relationship between the shutter glasses 195 and the frame sequential format. FIG. 5(a) illustrates that, when a left-eye image L is displayed in the display 180, the left eye glasses of the shutter glasses 195 is opened and the right eye glasses thereof is closed. FIG. 5(b) illustrates that the left eye glasses of the shutter glasses 195 is closed and the right eye glasses thereof is opened.

Meanwhile, the formatter 260 may switch a 2D video signal to a 3D video signal. For example, the formatter 260 may detect an edge or a selectable object within a 2D video signal, separate an object or a selectable object according to the detected edge, and generate the object or the selectable object as a 3D video signal according to a 3D video generation algorithm. Here, the generated 3D video signal, as described above, may be separated into a left-eye image signal L and a right-eye image signal R.

Meanwhile, an audio processing unit (not shown) within the control unit 170 may perform audio processing on a demultiplexed audio signal. To this end, the audio processing unit (not shown) may include various decoders.

For example, if the demultiplexed audio signal is a coded audio signal, the audio processing unit (not shown) may decode the coded audio signal. More particularly, if the demultiplexed audio signal is a coded audio signal according to the MPEG-2 standard, an MPEG-2 decoder may decode the coded audio signal. Furthermore, if the demultiplexed audio signal is a coded audio signal of the MPEG 4 Bit Sliced Arithmetic Coding (BSAC) standard according to a terrestrial Digital Multimedia Broadcasting (DMB) method, an MPEG 4 decoder may decode the coded audio signal. Furthermore, if the demultiplexed audio signal is a coded audio signal of the Advanced Audio Codec (AAC) standard of MPEG 2 according to the satellite DMB method or DVB-H method, an AAC decoder may decode the coded audio signal. Furthermore, if the demultiplexed audio signal is a coded audio signal of the Dolby AC-3 standard, an AC-3 decoder may decode the coded audio signal.

The audio processing unit (not shown) within the control unit 170 may process base, treble, volume control, and so on.

The data processing unit (not shown) within the control unit 170 may perform data processing on the demultiplexed data signal. For example, if the demultiplexed data signal is a coded data signal, the data processing unit may decode the coded data signal. The coded data signal may be Electronic Program Guide (EPG) information, including pieces of broadcast information, such as the start time, the end time, etc. of a broadcast program which is being broadcasted in each channel. For example, the EPG information may include ATSC-Program and System Information Protocol (ATSC-PSIP) information in case of the ATSC method and may include DVB-Service Information (DVB-SI) information in case of the DVB method. The ATSC-PSIP information or the DVB-SI information may be information included in the above stream (that is, the header (2 byte) of an MPEG-2 TS).

Meanwhile, an example where the signals from the OSD generation unit 240 and the video processing unit 220 are mixed by the mixer 245 and then subjected to 3D processing in the formatter 260 is illustrated in FIG. 2, but not limited thereto. The mixer may be placed behind the formatter. That is, the output of the video processing unit 220 may be subjected to 3D processing in the formatter 260, and the OSD generation unit 240 may generate an OSD signal, perform 3D processing, and mix the 3D signal processed by the mixer 245.

Meanwhile, the block diagram of the control unit 170 shown in FIG. 2 is a block diagram for an embodiment of the present invention. The constituent elements of the block diagram may be integrated, added, or omitted according to the specification of the control unit 170 that is implemented.

In particular, the frame rate conversion unit 250 and the formatter 260 may not be included in the control unit 170, but may be separately provided.

Figure 6:
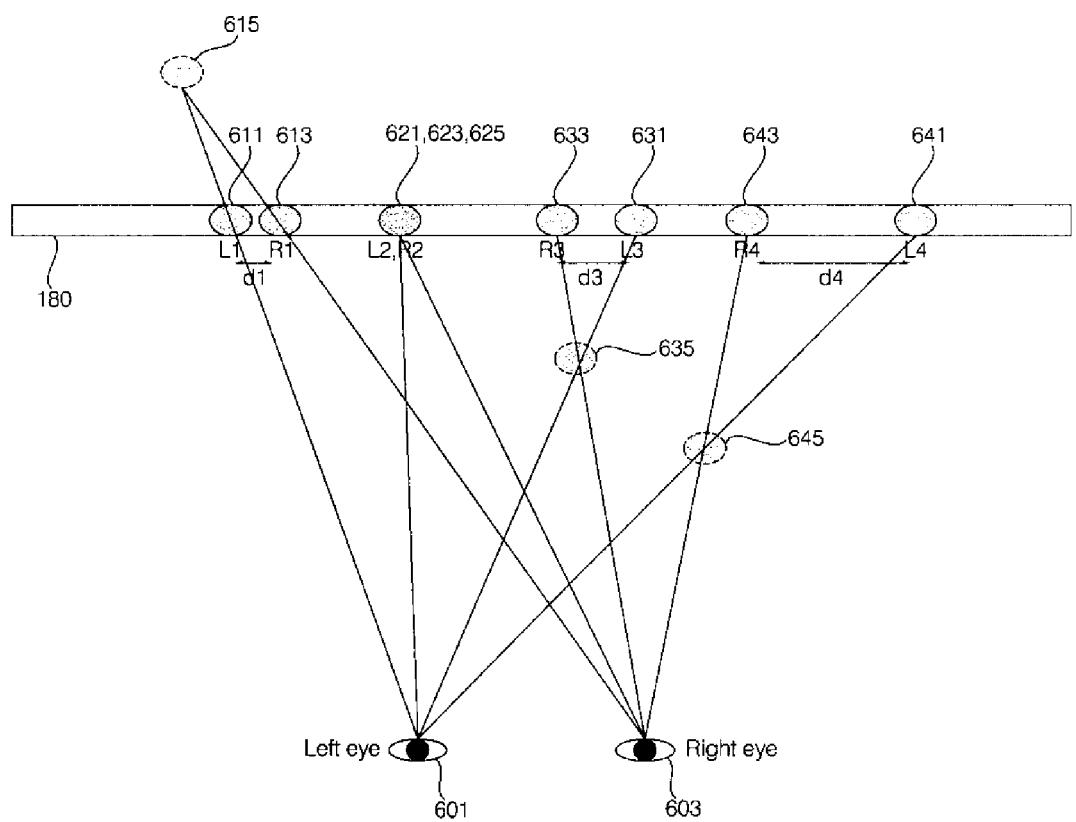
FIG. 6 is a diagram illustrating that an image is formed by a left-eye image and a right-eye image.
Figure 7:
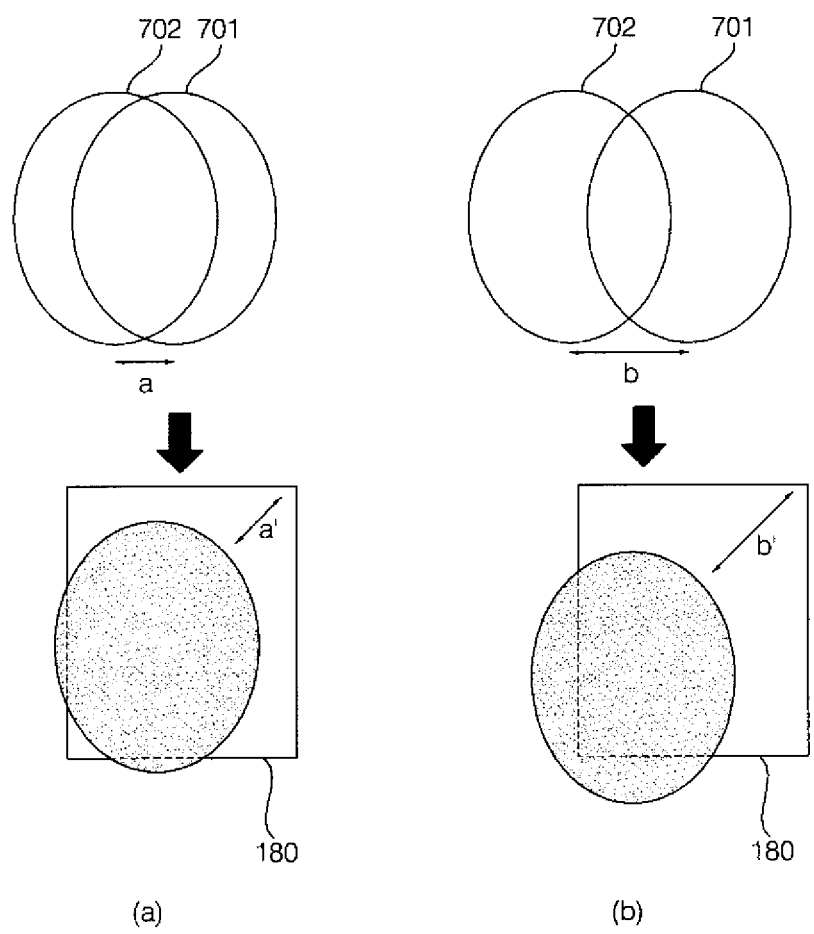
FIG. 7 is a diagram illustrating the depth of a 3D video according to the interval between a left-eye image and a right-eye image.

FIG. 6 is a diagram illustrating that an image is formed by a left-eye image and a right-eye image, and FIG. 7 is a diagram illustrating the depth of a 3D video according to the interval between a left-eye image and a right-eye image.

Referring to FIG. 6, a plurality of videos or a plurality of objects 615, 625, 635, and 645 is illustrated.

First, the first object 615 is illustrated to include a first left-eye image 611,L based on a first left-eye image signal and a first right-eye image 613,R based on a first right-eye image signal, and an interval of the first left-eye image 611,L and the first right-eye image 613,R is illustrated to be d1 on the display 180. Here, a user recognizes that an image looks like being formed at a point where a product, connecting a left eye 601 and the first left-eye image 611, and a product, connecting a right eye 603 and the first right-eye image 613,L, cross each other. Accordingly, the user recognizes that the first object 615 is placed behind the display 180.

Next, the second object 625 is illustrated to include a second left-eye image 621,L and a second right-eye image 623,R, and an interval of the second left-eye image 621,L and the second right-eye image 623,R is illustrated to be 0 because the second left-eye image 621,L and the second right-eye image 623,R are overlapped with each other and displayed in the display 180. Accordingly, a user recognizes that the second object 625 is placed on the display 180.

Next, each of the third object 635 and the fourth object 645 is illustrated to include a third left-eye image 631,L and a second right-eye image 633,R and a fourth left-eye image 641,L and a fourth right-eye image 643,R, and intervals thereof are d3 and d4, respectively.

According to the above method, a user recognizes that the third object 635 and the fourth object 645 are placed at respective positions where images are formed. In the drawing, a user recognizes that the third object 635 and the fourth object 645 are placed ahead of the display 180.

Here, the fourth object 645 is recognized ahead of the third object 635, that is, more protruded than the third object 635. This is because the interval d4 of the fourth left-eye image 641,L and the fourth right-eye image 643,R is greater than the interval d3 of the third left-eye image 631,L and the third right-eye image 633,R.

Meanwhile, in an embodiment of the present invention, the distance between the display 180 and the objects 615, 625, 635, and 645 recognized by a user is represented by a depth. Accordingly, a depth when the distance is recognized by a user as if it looks like being placed behind the display 180 is assumed to have a negative value (−), and a depth when the distance is recognized by a user as if it looks like being placed ahead of the display 180 is assumed to have a positive value (−). That is, the degree of depth is increased as the degree of protrusion in a user direction is increased.

From FIG. 7, it can be seen that, if the interval a between a left-eye image 701 and a right-eye image 702 shown in FIG. 7(a) is smaller than an interval b between a left-eye image 701 and a right-eye image 702 shown in FIG. 7(b), a depth a' of a 3D object in FIG. 7(a) is smaller than a depth b' of a 3D object in FIG. 7(b).

If a 3D video is illustrated as a left-eye image and a right-eye image as described above, a position where an image is recognized to be formed is changed from a viewpoint of a user according to an interval between the left-eye image and the right-eye image. Accordingly, a depth of a 3D video or a 3D object, consisting of a left-eye image and a right-eye image, may be controlled by controlling a display interval of the left-eye image and the right-eye image.

Figure 8:
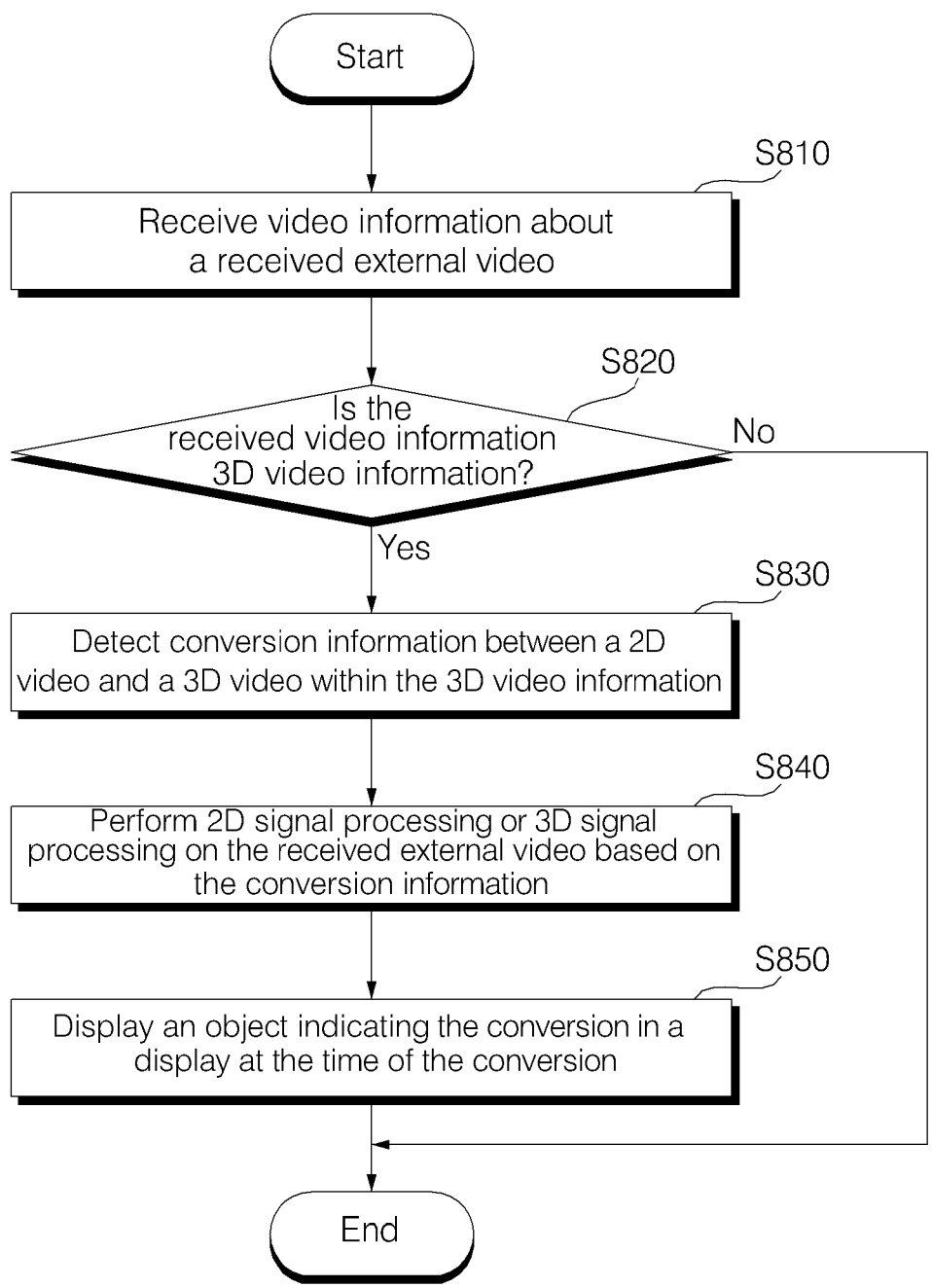
FIG. 8 is a flowchart illustrating a method of operating the video display apparatus according to an embodiment of the present invention.

FIG. 8 is a flowchart illustrating a method of operating the video display apparatus according to an embodiment of the present invention, and FIGS. 9 to 14 are diagrams to which reference is made to describe various examples of the method of operating the video display apparatus shown in FIG. 8.

Referring to FIG. 8, first, video information about a received external video or a received broadcast video is received (S810).

The received external video may be an external input video from the external device 190 or a video received from a content provider over a network. Furthermore, the broadcast video may be a broadcast video from a broadcast signal received from the tuber 110.

The video information may be broadcast information about a digital broadcast video (for example, the above ATSC-PSIP information or DVB-SI information) and may be video information about an external input video (for example, HDMI SI (system information) information). It is hereinafter assumed that the video information is an external input video received from the external device 190.

The external input video received from the external device 190 is inputted to the control unit 170 via the external device interface unit 130 and then subjected to signal processing. Here, it is important to check whether the external input video is a 2D video or a 3D video rapidly and simply because a decoder used upon decoding in the video processing unit 220 (in particular, the video decoder 225) within the control unit 170 is changed according to whether the external input video is the 2D video or the 3D video.

The external device interface unit 130 may receive not only the external input video from the external device 190, but also video information about the external input video.

The video information about the external input video may be, for example, transmission-related information (for example, a Display Data Channel (DDD)) between the external device 190 and the external device interface unit 130 within the video display apparatus 100, information indicating whether the external input video is a 2D video or a 3D video or the like.

Here, the transmission-related information may include information about the specification of the video display apparatus 100 (sink device) and about the representation ability of the video display apparatus 100 (sink device). For example, the transmission-related information may include information about whether the video display apparatus 100 can display a 3D video and about what is a 3D video format if the 3D video can be displayed. An external device may receive the transmission-related information from the video display apparatus 100.

Meanwhile, the transmission-related information of the video display apparatus 100 may be checked based on Extended Display Identification Data (EDID) within the video display apparatus 100. That is, the information about the specification, ability, etc. of the video display apparatus 100 may be checked through the EDID.

Figures 11, 12:
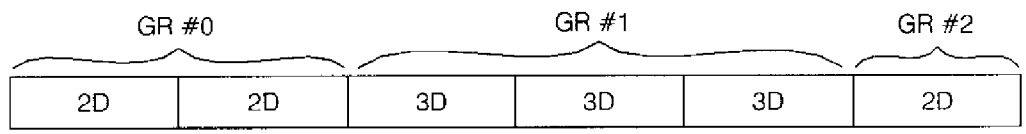

Meanwhile, the information indicating whether the external input video is a 2D video or a 3D video may be included in the header of a packet which is received by the external device interface unit 130, as shown in FIG. 11.

FIG. 11 illustrates HB0 1 byte (8 bits) and HB1 of 1 byte within a packet header. For example, if a value of HB0 within the packet header has a binary number '1011' (that is, a value of '11' in a decimal value) as shown, the value of HB1 may be defined to indicate 3D video information. Meanwhile, if the value of HB0 within the packet header is not the value of '11', the value of HB1 may be checked not to be 3D video information.

Meanwhile, the 3D video information HB1 may include information NO_3DM_Packet indicating whether 3D metadata exists within the packet, application validity information Valid_IN_Next indicating whether the 3D metadata is validly applicable in a next video frame or whether a received external video or a broadcast video is converted in the next video frame, target group information Current_GR# to which the received external video or the broadcast video belongs, and application group information Affected_GR# to which the 3D metadata is applied.

Here, the information NO_3DM_Packet indicating whether 3D metadata exists is represented by 1 bit. If the information NO_3DM_Packet has a value '1', it means that the 3D metadata does not exist in the packet. If the information NO_3DM_Packet has a value '0', it means that the 3D metadata exists in the packet.

Here, the 3D metadata may be placed in the header and payload of a packet, as described later with reference to FIG. 13.

Furthermore, the 3D metadata may include 3D format information illustrated in FIG. 4, a 3D coding method such as MVC or AVC, group information to which a corresponding packet is applied, etc.

Meanwhile, if the NO_3DM_Packet has the value of '1', it means that 3D metadata does not exist within the packet, but 2D data including the title of a video, etc. within a packet may be included.

Meanwhile, the NO_3DM_Packet may be selectively included in the packet header, but it is preferred that the NO_3DM_Packet be included as in the drawing before being converted into a 3D input or in case of a 3D mode. Accordingly, the NO_3DM_Packet may also be used as a flag for checking a 2D video input and a 3D video input.

Next, the application validity information Valid_IN_Next is represented by 1 bit. The application validity information of '1' may indicate that 3D metadata is validly applicable in a next video frame, and the application validity information of '0' may indicate that 3D metadata is invalidly applicable in a next video frame.

That is, the application validity information may mean whether the application group information GR# included in metadata, in particular, 3D metadata is identical with the group information GR# of a next video frame. Accordingly, if they are identical with each other, the application validity information may have '1', and if they are not identical with each other, the application validity information may have '0'.

Furthermore, if the application group information Affected_GR# and the target group information Current_GR# are not identical with each other in the state where the application validity information Valid_IN_Next is '1', it means that conversion is generated in a next video frame. If they are identical with each other, it may mean that conversion is generated in a corresponding video frame.

Next, the application group information Affected_GR# is represented by 3 bits, and it indicates a group index to which 3D metadata is applied.

Next, the target group information Current_GR# is represented by 3 bits, and it indicates a group index of a target video frame now being received.

Next, if the received video information is 3D video information (S820), conversion information between a 2D video and a 3D video within the 3D video information is detected (S830).

The conversion information is information indicating that the received external video or the broadcast video is converted from a 2D video to a 3D video or from a 3D video to a 2D video. For example, the conversion information is chiefly applied when an external video or a broadcast video received from the external device 190 is a mixture of a 2D video and a 3D video.

The conversion information may have one piece of information, but, in an embodiment of the present invention, may be calculated by a combination of a plurality of pieces of information.

The conversion information may include the information NO_3DM_Packet indicating whether 3D metadata exists in the 3D video information HB1 as described above. The conversion information may further include the application validity information Valid_IN_Next and the application group information Affected_GR#.

Figure 10:
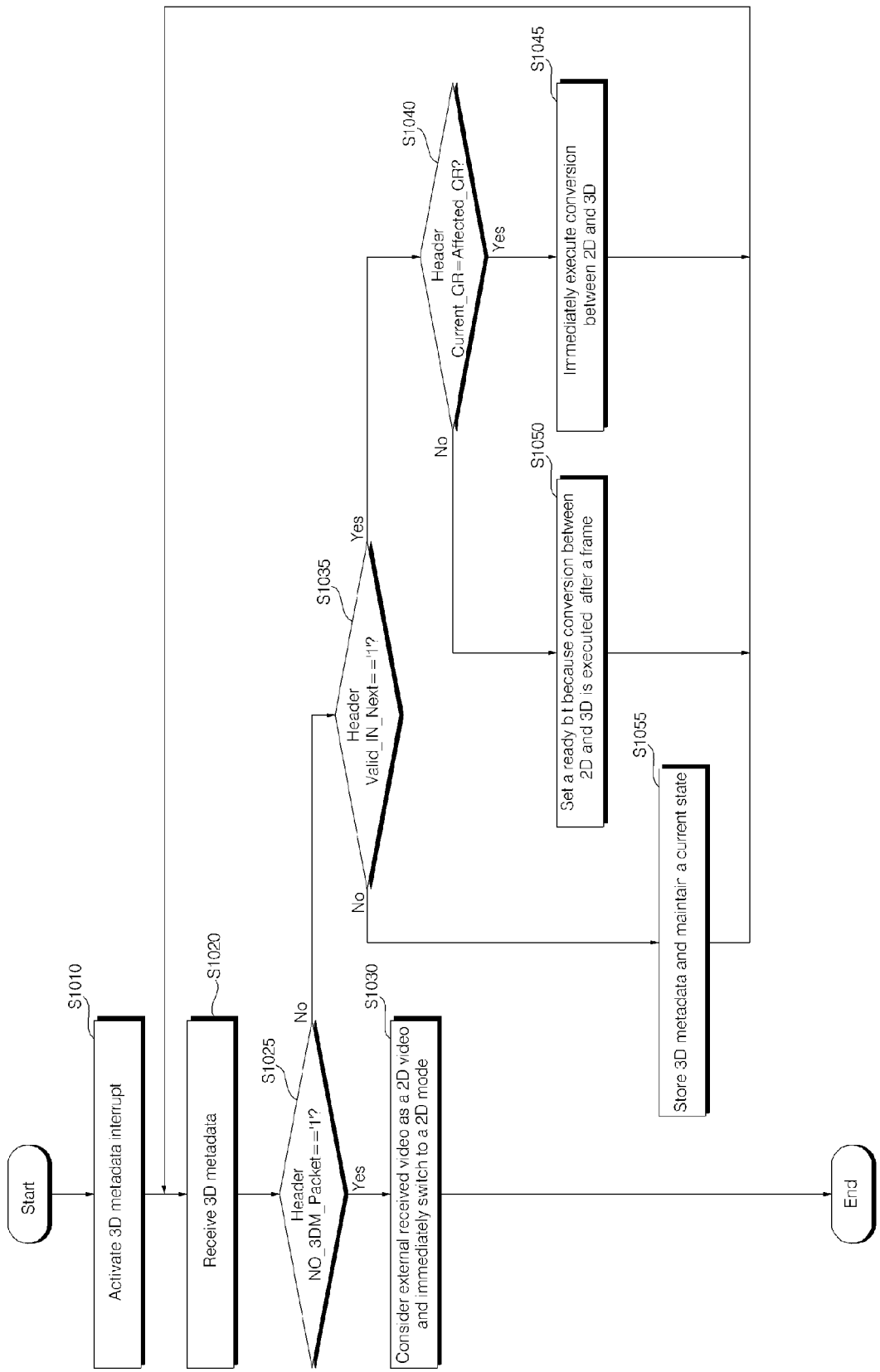

Consequently, as shown in FIG. 10, the detection of the conversion information may be performed by detecting the information NO_3DM_Packet indicating whether 3D metadata exists, the application validity information Valid_IN_Next, and the application group information Affected_GR# as described above.

Next, the received external video or the received broadcast video is subjected to 2D signal processing or 3D signal processing based on the conversion information (S840).

Figure 13:
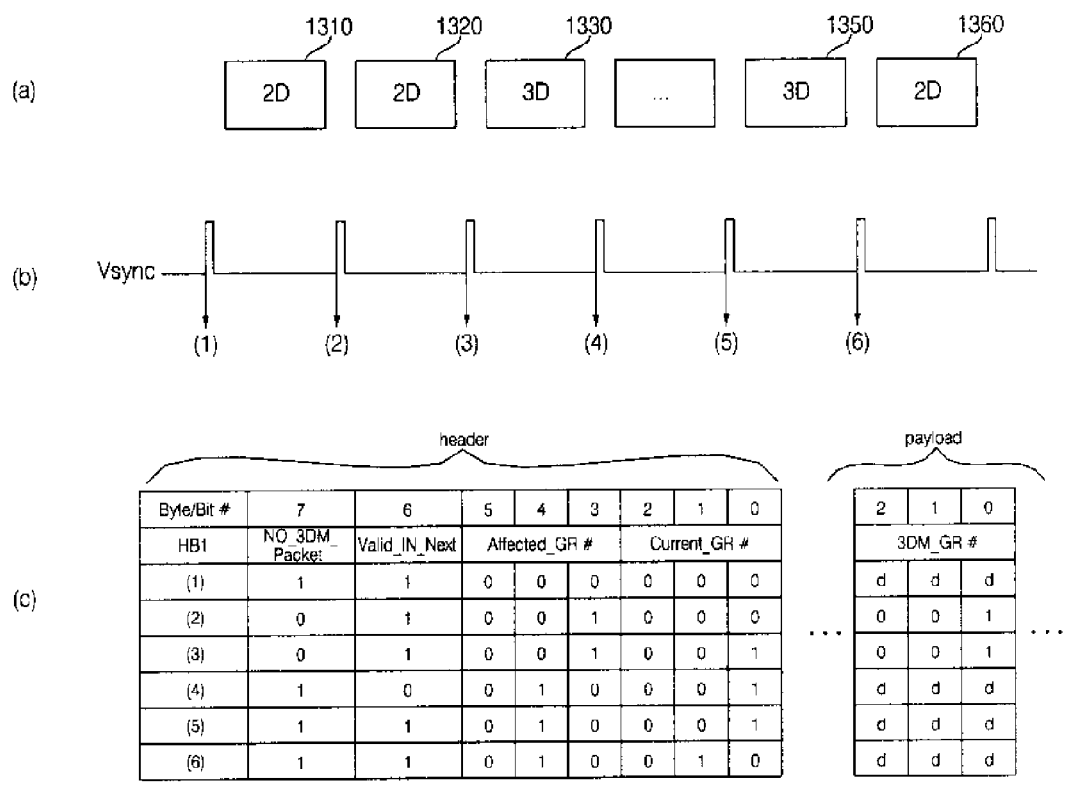

FIG. 12 shows an example of external input videos, and FIG. 13 illustrates values of 3D video information HB1 including conversion information according to FIG. 12.

FIGS. 12 and 13 sequentially illustrate a 2D video 1310, a 2D video 1320, a 3D video 1330, . . . , a 3D video 1350, and a 2D video 1360.

The target group information Current_GR# is determined according to whether the received external video or the broadcast video is a 2D video or a 3D video. Accordingly, the 2D video 1310 and the 2D video 1320 are made to have GR#0 of a binary number '000', the 3D video 1330, . . . , the 3D video 1350 are made to have GR#1 of a binary number '001', and the 2D video 1360 is made to have GR#2 of a binary number '010'.

Meanwhile, FIG. 13(c) illustrates that a packet includes a header and a payload. Each packet, in particular, the payload is illustrated to include 3D metadata having group information to which the packet is applied. Meanwhile, the payload may further include 2D metadata in addition to 3D metadata.

Meanwhile, the received external video or the received broadcast video is received in synchronism with a vertical synchronization signal Vsync. When the received external video or the received broadcast video is received, video information about the external video or the broadcast video is received separated from the external video or the broadcast video. Here, the video information may include a header and a payload in the form of a packet.

In the drawing, pieces of video information (1) to (6) about each of six external videos or six broadcast videos are combined in six vertical synchronization frequencies.

In the pieces of video information (1), (4), (5), and (6) of the pieces of video information (1) to (6), the group information (=GR#) to which 3D metadata within a payload is applied may have any value because the information NO_3DM_Packet indicating whether 3D metadata exist has a value of '1'. Accordingly, each bit is illustrated to be 'd' as in the drawing.

Meanwhile, in case of (2) and (3), the information NO_3DM_Packet indicating whether 3D metadata exists has a value of '0'.

From among them, in case of (2), 3D metadata exists in the packet, the group information 3DM_GR# to which the packet of 3D metadata is applied is a binary number '001' (=GR#1), the application group information Affected_GR# is a binary number '001' (=GR#1), and the target group information Current_GR# is a binary number '000'=GR#0, Since the group information (=GR#1) to which 3D metadata is applied is identical with the group information (=GR#1) of a next video frame, the application validity information Valid_IN_Next has a value of '1'. Meanwhile, since the group information (=GR#1) to which 3D metadata is applied corresponds to a 3D video as the external video 1320 later, the information NO_3DM_Packet indicating whether 3D metadata exists may have a value of '0'.

Meanwhile, in (2), video conversion is performed in a next frame because the application group information (=GR#1) is different from the target group information=GR#0 in the state where the application validity information Valid_IN_Next is '1'. That is, video is converted into the 3D video 1330 in a next video frame in the state where the received external video 1310 is a 2D video.

Meanwhile, in (3), video conversion is performed with constant delay in the state where the application validity information Valid_IN_Next is '1' because the application group information (=GR#1) is identical with the target group information (=GR#1).

Meanwhile, in (4), the group information 3DM_GR# to which a relevant packet of 3D metadata is applied may have any value. However, for example, if the group information has a binary number '010' (=GR#2), the application group information Affected_GR# is a binary number '010' (=GR#2), the target group information Current_GR# is a binary number '001' (=GR#1), the received external video 1340 is a 3D video, and the application validity information Valid_IN_Next has a value of '0' because video conversion is not generated in a next video frame. That is, since the group information (=GR#2) to which 3D metadata is applied is different from the group information (=GR#0) of the next video frame, the application validity information Valid_IN_Next has '0'. Meanwhile, since the group information (=GR#2) to which 3D metadata is applied does not correspond to a 3D video as the next external video 1320, the information NO_3DM_Packet indicating whether 3D metadata exists may have a value of '1'.

From among them, in (3), it can be seen that a 2D video is converted into a 3D video.

Meanwhile, if the Valid_IN_Next='1', the target group information Current_GR#, and the application group information Affected_GR# are not identical in the state where the application validity information Valid_IN_Next is validly applicable in a next video frame ((2) and (5)), a ready bit for conversion in a next video frame is set. Accordingly, conversion is performed in the next video frame.

In other words, if the Valid_IN_Next='1', the target group information Current_GR#, and the application group information Affected_GR# are not identical in the state where the application validity information Valid_IN_Next indicates that it is validly applicable in a next video frame (2), conversion between a 2D video and a 3D video is performed with constant delay in a next frame (3). Accordingly, 2D video being processed in the control unit 170 is converted into 3D video processing, or 3D video being processed in the control unit 170 is converted into 2D video processing.

As described above, if the conversion information, including the application validity information Valid_IN_Next, the target group information Current_GR#, and the application group information Affected_GR#, is used, conversion between 2D and 3D in an external video received from the external device 190 or a broadcast video received from tuber 110 can be checked simply and easily.

Meanwhile, if the application validity information Valid_IN_Next indicates that it is invalidly applicable in a next video frame (Valid_IN_Next='0') (4), signal processing is performed without additionally converting a received external video or a received broadcast video. That is, the control unit 170 continues to perform 3D video processing.

Figure 9:
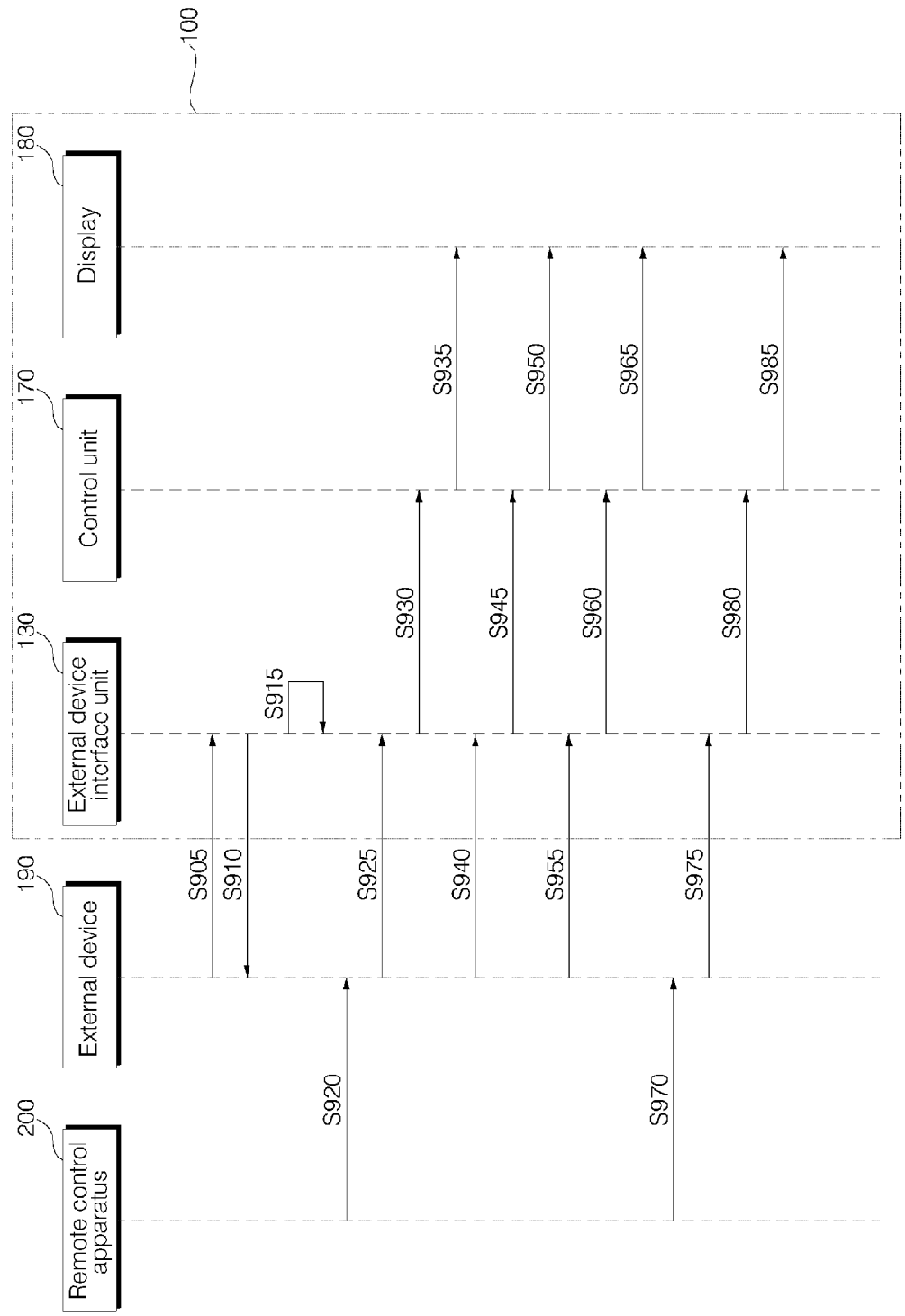
FIGS. 9 to 14 are diagrams to which reference is made to describe various examples of the method of operating the video display apparatus shown in FIG. 8.

Meanwhile, FIGS. 9, and 10 are flowcharts illustrating the above-described operations.

FIG. 9 sequentially illustrates signal processing between the remote control apparatus 200, the external device 190, the external device interface unit 130, the control unit 170, and the display 180.

First, the permitted capacity or capability of the external device interface unit 130 is checked between the external device 190 and the external device interface unit 130 connected to each other (S905), and information about the external device interface unit 130 is transmitted to the external device 190 (S910).

Accordingly, the external device interface unit 130 activates a 3D interrupt (S915).

Meanwhile, when a user plays content within the external device 190 through the remote control apparatus 200 (S920), the external device 190 hands a video of played content and video information to the external device interface unit 130 (S925). Next, the external device interface unit 130 informs the control unit 170 that the corresponding video is a 2D video, if the corresponding video is checked to be the 2D video based on the received video and the received video information (S930). Accordingly, the control unit 170 performs 2D signal processing (decodes) on the received video and provides the resulting video to the display 180 (S935).

Meanwhile, the external device 190 continues to hand a video of played content and relevant video information to the external device interface unit 130 (S940). Next, if the corresponding video is checked to be a 3D video based on the received video and the video information, the external device interface unit 130 informs the control unit 170 that the corresponding video is the 3D video (S945). Accordingly, the control unit 170 performs 3D signal processing (decodes) on the received video through conversion of signal processing and provides the resulting video to the display 180 (S950).

The external device 190 continues to hand a video of played content and relevant video information to the external device interface unit 130 (S955). If the corresponding video is checked to be a 2D video based on the received video and the video information, the external device interface unit 130 informs the control unit 170 that the corresponding video is the 2D video (S960). Accordingly, the control unit 170 performs 2D signal processing (decodes) on the received video through conversion of signal processing and provides the resulting video to the display 180 (S965).

Furthermore, if there is a content play stop or power-off signal received from the remote control apparatus 200 (S970), the external device 190 informs the external device interface unit 130 that the external device 190 has been unplugged (S975), the external device interface unit 130 informs the control unit 170 that the external device 190 has been unplugged (S980), and the control unit 170 transfers, to the display, that the external device 190 has been unplugged (S985).

FIG. 10 illustrates signal processing according to the reception of 3D video information between the external device interface unit 130 and the control unit 170 within the video display apparatus 100. That is, this drawing illustrates signal processing on the packet header of FIG. 11.

First, as in the step (S915), the external device interface unit 130 activates a 3D interrupt (S1110). Accordingly, the external device interface unit 130 is prepared to receive a video and information about the video which are received from the external device 190.

Next, the external device interface unit 130 receives 3D metadata (S1020). If a value of HB0 of a packet header shown in FIG. 11 is '11' as described above, the external device interface unit 130 receives 3D video information HB1 within the packet header as 3D metadata.

It is then determined whether the information NO_3DM_Packet indicating whether 3D metadata exists in the header has a value of '1' (S1025).

If the information NO_3DM_Packet has the value of '1', it is determined that the 3D metadata does not exist, and thus data processing on 3D metadata is not performed. For example, an external input video may be considered as a 2D video and conversion to a 2D mode may be immediately performed (S1030). Accordingly the control unit 170 performs 2D signal processing on the received video.

Meanwhile, if the information NO_3DM_Packet have a value of '0', the 3D metadata is determined to exist, and thus steps subsequent to step S1035 are performed.

It is then determined whether the application validity information Valid_IN_Next within the header has a value of '1' (S1035).

If the application validity information Valid_IN_Next has the value of '1' (that is, it indicates that an application is valid in a next video frame), it is determined whether the target group information Current_GR# and the application group information Affected_GR# within the 3D metadata are identical with each other (S1040).

If the target group information Current_GR# and the application group information Affected_GR# within the 3D metadata are not identical with each other in the state where the application validity information Valid_IN_Next has the value of '1', a ready bit is set because conversion between 2D and 3D is performed after a next frame (S1050). Accordingly, the control unit 170 is prepared to perform a conversion operation.

Meanwhile, if the target group information Current_GR# and the application group information Affected_GR# within the 3D metadata are identical with each other in the state where the application validity information Valid_IN_Next has the value of '1', conversion between 2D and 3D is performed with constant delay (S1045). Accordingly, the control unit 170 performs 3D signal processing on a received video, being subjected to 2D signal processing, or 2D signal processing on the received video, being subjected to 3D signal processing, by performing the conversion operation.

Meanwhile, if the application validity information Valid_IN_Next has a value of '0', the control unit 170 stores 3D metadata without an additional conversion operation and maintains a current state (S1050). That is, the control unit 170 maintains a current state without a change of signal processing. Meanwhile, the stored 3D metadata may be used to compare the stored 3D metadata with another 3D metadata when a subsequent frame is received.

Meanwhile, the step S1020 may continue to be performed subsequently to the steps S1045, S1050, and S1055. That is, 3D metadata within a packet subsequently received is received. Next, the operations subsequent to the step S1020 may be repeated.

Meanwhile, at the time of the conversion, an object indicating the conversion is displayed in the display (S850).

Figure 14:
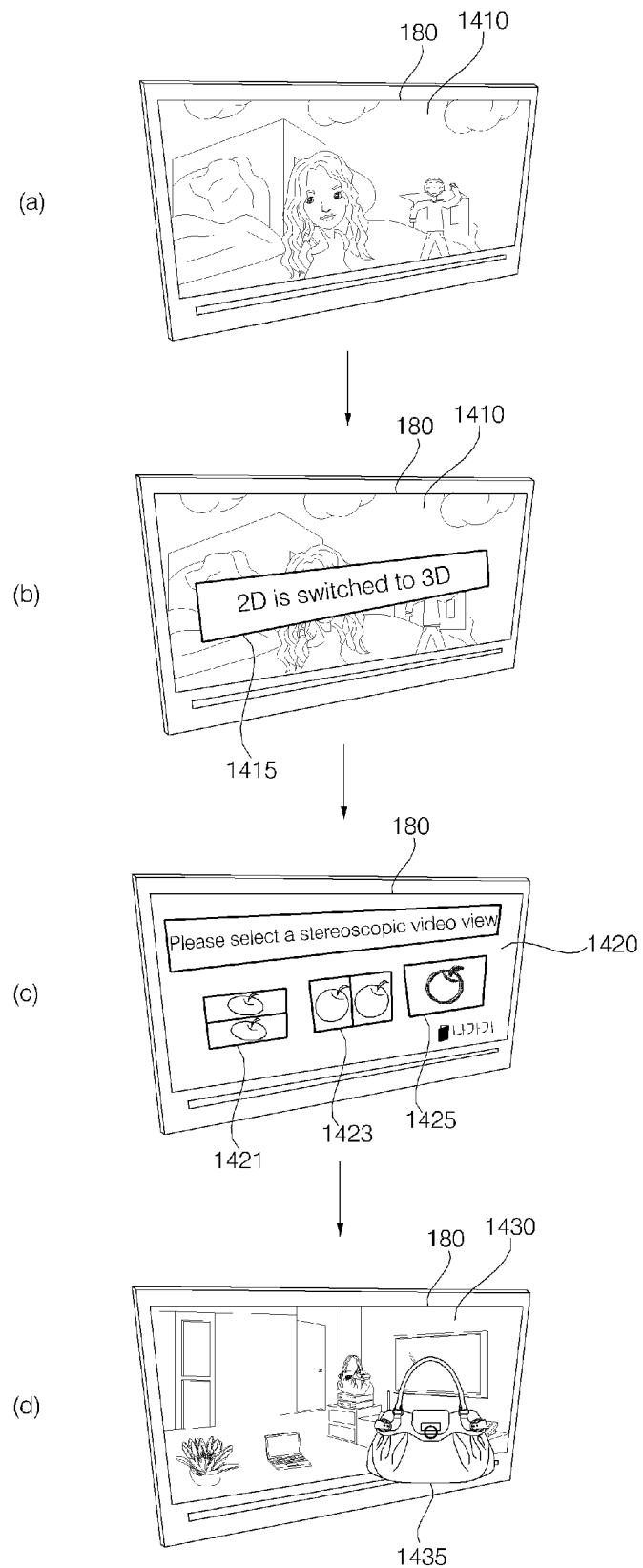

FIG. 14 illustrates that, when a 2D video 1410 is displayed in the display 180 (FIG. 14 (*a*)) and externally received content is converted into 3D, an object 1415 indicating the conversion is displayed in the display 180 (FIG. 14 (*b*)), a screen 1420 where a 3D format suitable for 3D watching can be selected at the time of the conversion is displayed in the display 180 (FIG. 14 (*c*)), and a 3D video 1430 including an object 1435 that looks like being protruded is displayed in the display 180 (FIG. 14 (*c*)).

In case of conversion from 2D to 3D and from 3D to 2D as described above, an object indicating the conversion is displayed in the display, so that a user can easily check the conversion. In particular, if the additional 3D display 195 is used, a point of time at which the additional 3D display 195 is worn or taken off can be accurately known.

Furthermore, as shown in FIG. 14(*c*), an object 1421 indicating the top/down format, an object 1423 indicating the side-by-side format, and an object 1425 indicating the checker box are illustrated. In addition, objects for various formats may be further displayed as shown in FIG. 4. Accordingly, a user may select a 3D format most suitable for 3D watching and watch a 3D video by selecting the format.

The video display apparatus and the method of operating the same according to the present invention are not limited and applied to the constructions and methods of the embodiments described as above, but all or some of the embodiments may be selectively combined and configured so that the embodiments may be modified in various ways.

Meanwhile, the method of operating the video display apparatus according to the present invention may be implemented in a recording medium, readable by a processor included in the video display apparatus, in the form of processor-readable codes. The processor-readable recording medium may include all kinds of recording devices in which processor-readable data is stored. The processor-readable recording medium may include, for example, ROM, RAM, CD-ROM, magnetic tapes, floppy disks, and optical data storages and may also include carrier wave forms, such as transmission over the Internet. Furthermore, codes, distributed into computer systems connected over a network and readable by the processor, may be stored and executed in the processor-readable recording medium in a distributed manner.

Furthermore, although the preferred embodiments of the present invention have been shown and described, the present invention is not limited to the above specific embodiments, and a person having ordinary skill in the art to which the invention belongs may modify the embodiments in various ways without departing from the gist of the present invention which is written in the claims. The modified embodiments should not be interpreted individually from the technical spirit or prospect of the present invention.

The invention claimed is:

1. A method of operating a video display apparatus, the method comprising:
receiving video information associated with a received external video or a received broadcast video;
detecting conversion information indicating that the received external video or the received broadcast video has been converted from a two-dimensional (2D) video to a three-dimensional (3D) video or from a 3D video to a 2D video within 3D video information, if the received video information is the 3D video information; and
performing 2D signal processing or 3D signal processing on the received external video or the received broadcast video based on the conversion information,
wherein the conversion information comprises application validity information (Valid_IN_Next) indicating whether received metadata is validly applicable in a next video frame or whether the received external video or the received broadcast video is converted in the next video frame,
wherein the conversion information further comprises target group information (Current GR#) to which the received external video or the broadcast video belongs and application group information (GR#) to which 3D metadata is applied,
wherein, if the target group information and the application group information are identical with each other in a state where the application validity information indicates application validity, the 2D signal processing or the 3D signal processing is performed on the received external video or the received broadcast video by performing the conversion,
wherein, if the target group information and the application group information are not identical with each other in a state where the application validity information indicates application validity, a ready bit for conversion in the next video frame is set, and
wherein, when the application validity information indicates application invalidity, the received external video or the received broadcast video is subjected to signal processing without conversion.

2. The method of claim 1, further comprising:
displaying an object indicating the conversion of the received external video or the received broadcast video in a display upon the conversion.

3. The method of claim 1, wherein the 3D video information comprises information indicating whether 3D metadata exists.

4. The method of claim 2, further comprising:
displaying objects, indicating a plurality of 3D video formats, in the display, if the received external video or the received broadcast video has been converted from the 2D video to the 3D video.

5. A video display apparatus, comprising:
an external device interface unit configured to communicate with an external device;
a control unit configured to detect conversion information indicating that a received external video or a received broadcast video has been converted from a two-dimensional (2D) video to a three-dimensional (3D) video or from a 3D video to a 2D video from at least a portion of video information associated with received external video or the received broadcast video received from the external device via the external device interface unit, and perform 2D signal processing or 3D signal processing on the received external video or the received broadcast video based on the conversion information; and
a configured to display the received external video or the received broadcast video subjected to the 2D signal processing or the 3D signal processing,
wherein the conversion information comprises application validity information (Valid_IN_Next) indicating whether received metadata is validly applicable in a next video frame or whether the received external video or the received broadcast video is converted in the next video frame, wherein the conversion information further comprises target group information (Current GR#) to which the received external video or the broadcast video belongs and application group information (GR#) to which 3D metadata is applied, wherein the control unit performs the 2D signal processing or the 3D signal processing on the received external video or the received broadcast video by performing the conversion, if the target group information and the application group information are identical with each other in a state where the application validity information indicates application validity, wherein the control unit sets a ready bit for conversion in the next video frame, if the target group information and the application group information are not identical with each other in a state where the application validity information indicates application validity, and wherein the control unit performs signal processing on the received external video or the received broadcast video without conversion, if the application validity information indicates application invalidity.

6. The video display apparatus of claim 5, wherein the display is further configured to display an object indicating the conversion of the received external video or the received broadcast video upon the conversion.

7. The video display apparatus of claim 5, wherein the 3D video information comprises information indicating whether 3D metadata exists.

\* \* \* \* \*